(12) United States Patent
Butko

(10) Patent No.: US 12,386,604 B2
(45) Date of Patent: Aug. 12, 2025

(54) QUANTUM INSTRUCTION SET ARCHITECTURE (QUASAR)

(71) Applicant: THE REGENTS OF THE UNIVERSITY OF CALIFORNIA, Oakland, CA (US)

(72) Inventor: Anastasiia Butko, Alameda, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 265 days.

(21) Appl. No.: 18/048,377

(22) Filed: Oct. 20, 2022

(65) Prior Publication Data

US 2023/0131389 A1   Apr. 27, 2023

Related U.S. Application Data

(60) Provisional application No. 63/271,277, filed on Oct. 25, 2021.

(51) Int. Cl.
*G06F 8/51*       (2018.01)
*G06F 15/78*      (2006.01)
*G06N 10/80*      (2022.01)

(52) U.S. Cl.
CPC ............... *G06F 8/51* (2013.01); *G06F 15/78* (2013.01); *G06N 10/80* (2022.01)

(58) Field of Classification Search
None
See application file for complete search history.

(56) References Cited

U.S. PATENT DOCUMENTS

| | | | |
|---|---|---|---|
| 2018/0260245 A1* | 9/2018 | Smith | G06F 9/4881 |
| 2019/0042264 A1* | 2/2019 | Zou | G06F 9/30 |
| 2019/0042677 A1* | 2/2019 | Matsuura | G06N 10/20 |
| 2019/0042971 A1* | 2/2019 | Zou | G06F 9/30043 |
| 2019/0042973 A1* | 2/2019 | Zou | G06F 9/3016 |
| 2020/0242207 A1* | 7/2020 | Shehab | G06F 30/30 |
| 2021/0182724 A1* | 6/2021 | Zou | G06N 10/20 |
| 2021/0286599 A1* | 9/2021 | Gazda | G06F 8/41 |

(Continued)

OTHER PUBLICATIONS

Fritzmann et al., "RISQ-V: Tightly Coupled RISC-V Accelerators for Post-Quantum Cryptography," IACR, 2020, 42pg. (Year: 2020).*

(Continued)

*Primary Examiner* — Ryan D. Coyer
(74) *Attorney, Agent, or Firm* — O'BANION & RITCHEY LLP; John P. O'Banion

(57) ABSTRACT

A Quantum Instruction Set Architecture (QUASAR) for quantum control processors, and a method which provides an interface for rapid and consistent development for controlling quantum computing systems which have different quantum computer chips and associated low-level control hardware. The method includes compiling a source program; decoding instructions by checking the opcode and determining whether said instruction is a single-qubit gate operation, a two-qubit gate operation, a measurement operation or a timing control operation; determining if each instruction is an immediate or register-based operation; decoding each specific instruction to generate machine code and/or netlists for execution by a quantum control unit configured for controlling a quantum computer chip and its associated low-level control hardware.

14 Claims, 6 Drawing Sheets

QUASAR instruction formats

(56) References Cited

U.S. PATENT DOCUMENTS

2021/0357278 A1* 11/2021 Lee .................. G06F 9/547
2022/0335319 A1* 10/2022 Zhang ................ G06N 10/00

OTHER PUBLICATIONS

Preskill, John, "Quantum Computing in the NISQ era and beyond," Quantum, 2018, 22pg. (Year: 2018).*

Butko, Anastasiia et al., "Understanding Quantum Control Processor Capabilities and Limitations through Circuit Characterization", arXiv:1909.11719v2, [quant-ph], Dec. 4, 2020, pp. 1-10.

Butko, Anastasiia et al., "Extending Classical Processors to Support Future Large Scale Quantum Accelerators", In Proceedings of the 16th conference on Computing Frontiers (CF '19), https://doi.org/10.1145/3310273.3324898, 2019, pp. 317.

Butko, Anastasiia et al., "Building an Open Control Stack for Quantum Computers using RISC-V Ecosystem", at RISC-V Summit, Dec. 8-10, 2020, pp. 1-25.

Butko, Anastasiia et al., "Understanding Quantum Control Processor Capabilities and Limitations through Circuit Characterization", 2020 International Conference on Rebooting Computing (ICRC), 2020, pp. 66-75.

Butko, Anastasiia "Extending classical processors to support future large scale quantum accelerators", Lawrence Berkeley National Laboratory (LBNL), NECST Visit, May 28, 2019, pp. 1-30.

Butko, Anastasiia "Architectural Challenges in the Era of Quantum Computing Adoption", Lawrence Berkeley National Laboratory, Mar. 31, 2020, pp. 1-50.

Butko, Anastasiia et al., "Understanding Quantum Control Processor Capabilities and Limitations through Circuit Characterization", arXiv:1909.11719v1 [quant-ph] Sep. 25, 2019, pp. 1-11.

* cited by examiner

QUASAR instruction formats

Single-qubit Standard Rotation Immediate Instructions

| 31 | 26 25 | 24  20 19 | 12 11 | 7 6 | 0 |
|---|---|---|---|---|---|
|  | imm[8] | imm[7:0] |  | opcode |  |

AI-imm[8:0]  
X90I/Y90I/X180I  
Y180I/X270I  
Y270I/II

FIG. 2

Single-qubit Standard Rotation Mask Instructions

| 31 | 26 25 | 24 20 19 | 15 14 | 12 11 | 7 6 | 0 |
|---|---|---|---|---|---|---|
|  | imm[3] | rs1 | imm[2:0] |  | opcode |  | offset[3]  mask  offset[2:0]  
X90/Y90/X180  
Y180/X270  
Y270/I

FIG. 3

Single-qubit Arbitrary Rotation Immediate Instructions

| 31 | 26 25 | 24 20 19 | 12 11 | 7 6 | 0 |
|---|---|---|---|---|---|
|  | imm[8] | rs2 | imm[7:0] |  | opcode |  |

AI-imm[8]  phase  AI-imm[7:0]  ZI

FIG. 4

QUANTUM INSTRUCTION SET ARCHITECTURE (QUASAR)

CROSS-REFERENCE TO RELATED APPLICATIONS

This application claims priority to, and the benefit of, U.S. provisional patent application Ser. No. 63/271,277 filed on Oct. 25, 2021, incorporated herein by reference in its entirety.

STATEMENT REGARDING FEDERALLY SPONSORED RESEARCH OR DEVELOPMENT

This invention was made with Government support under Contract No. DE-AC02-05CH11231 awarded by the U.S. Department of Energy. The government has certain rights in the invention.

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to quantum computing systems, and more particularly to using an instruction set architecture for performing control operations in different quantum computer hardware systems.

2. Background Discussion

Presently, state-of-the-art quantum computers are typically controlled by an ad-hoc combination of control system electronics which are highly diversified. The control system electronics provide an interface which lacks uniformity that would allow for rapidly developing quantum computer applications.

Accordingly, a need exists for architectures which provide an interface for rapid and consistent development even on different quantum computing systems.

BRIEF SUMMARY

A Quantum Instruction Set Architecture (QUASAR) is described for quantum control processors. As quantum computing matures, there are advantages to be gained from a well-defined interface between software and hardware. In classical computing, such an interface is usually referred to as an Instruction Set Architecture (ISA). The ISA acts as a contract between hardware and software by explicitly describing the set of available operations, machine instruction format, supported data types, registers, and memory addressing. A well-designed ISA can present a very compact and efficient mechanism for accessing the specialized features on a computing device. In contrast to classical instruction sets, quantum ISAs operate on different types of computations. Traditional Arithmetic Logic Unit (ALU) operations are replaced by a set of basic quantum gates (e.g., Hadamard, CNOT, SWAP) applied on direct-addressed qubits and/or qubit registers. In addition to quantum operations, quantum ISAs also include memory load/store operations as well as conditional and non-conditional statements, which allows algorithm branching and measurement-based feedback support.

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only:

FIG. 2 is an opcode map for a single-qubit standard rotation immediate instruction, according to at least one embodiment of the present disclosure.

FIG. 3 is an opcode map for a single-qubit standard rotation mask instruction, according to at least one embodiment of the present disclosure.

FIG. 4 is an opcode map for a single-qubit arbitrary rotation immediate instruction, according to at least one embodiment of the present disclosure.

DETAILED DESCRIPTION

1. Introduction

Figure 1:
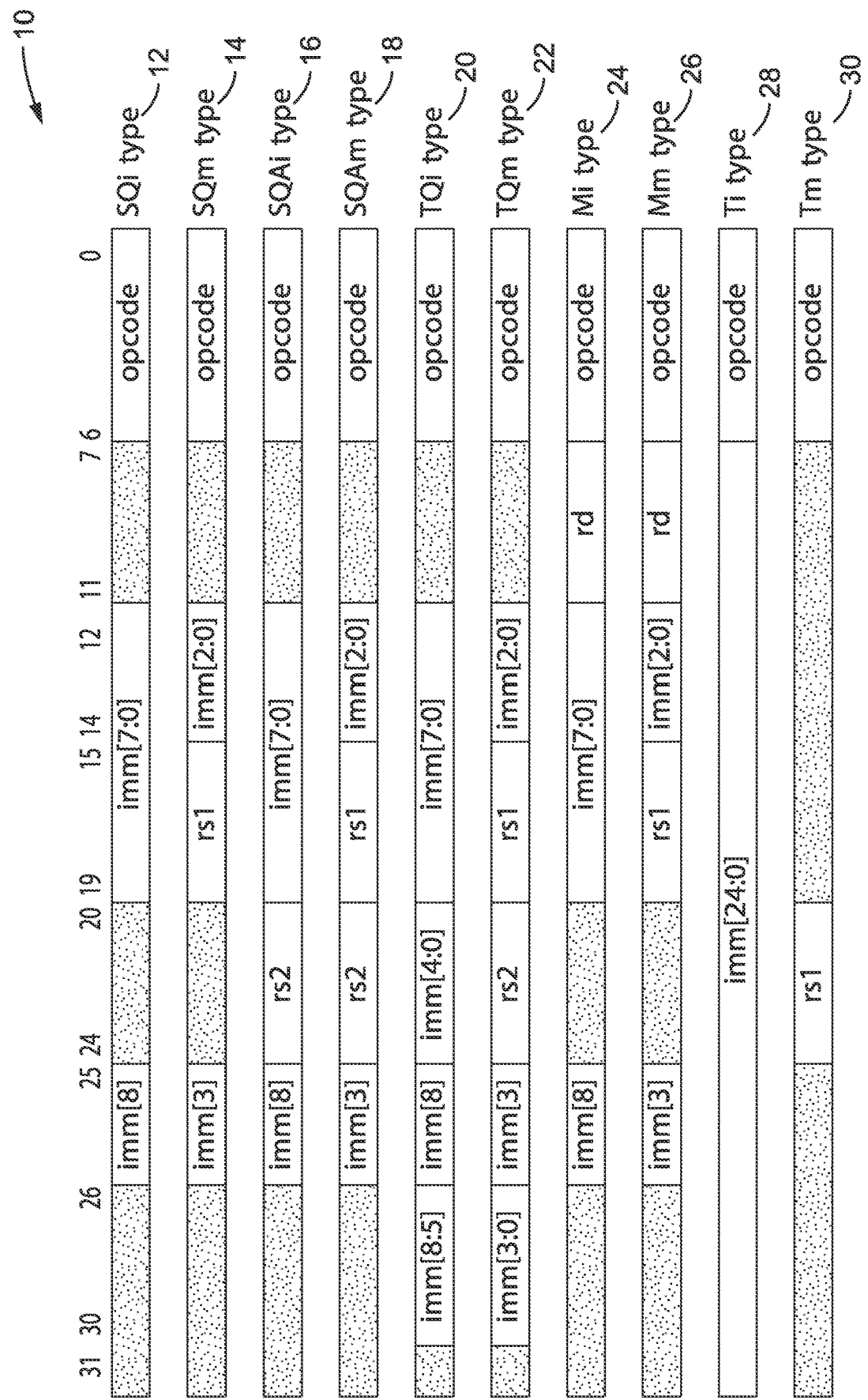
FIG. 1 is an opcode map of different QUASAR instruction formats, showing bit position, according to at least one embodiment of the present disclosure.

Quantum computing is different from conventional computing. In terms of physical implementation, quantum computing devices (e.g., chips in case of superconducting technology) are controlled by arbitrary generated waves. In terms of a high-level programming and computing model, quantum operations are represented as quantum gates that correspond to particular waves. The following provides information on certain different quantum abstraction levels.

1.1. Quantum Computation Model

Quantum bits (qubits) are two-level quantum-mechanical systems, whose general quantum state is represented by a linear combination of two orthonormal basis states (basis vectors). The most common basis is the equivalent of the 0 and 1 used for bits in classical information theory, respectively $$|0\rangle = \begin{bmatrix} 1 \\ 0 \end{bmatrix} \text{ and } |1\rangle = \begin{bmatrix} 0 \\ 1 \end{bmatrix}.$$

The generic qubit state is a superposition of the basis states, i.e., $|\psi\rangle = \alpha|0\rangle + \beta|1\rangle$ with $\alpha$ and $\beta$ being complex amplitudes such as $|\alpha|^2 + |\beta|^2 = 1$. The prevalent model of quantum computation is a circuit model in which information carried by qubits is modified by quantum gates that mathematically correspond to unitary operations. A complex square matrix U is unitary if its conjugate transpose $UU^* = U^*U = 1$.

1.2. Quantum Algorithms

A quantum algorithm is a step-by-step procedure in which for each step a quantum gate can be applied on a quantum bit. There are numerous known quantum algorithms, with popular examples being cryptography, search and optimization, simulation of quantum systems, and solving large systems of linear equations. However, the most common algorithms that are often presented as a sub-routine are Shor's Quantum Fourier transform (QFT) and Grover's algorithm for performing quantum search. The Harrow-Hassidim Lloyd (HHL) algorithm usually employs a composition of basic algorithms, such as QFT with state preparation. Besides algorithms, practitioners run randomized circuits for hardware characterization using randomized benchmarking, quantum volume, or circuits with randomization for error mitigation using randomized compiling. The term "quantum supremacy" refers to demonstrating that a quantum computer can solve a problem that cannot be practically solved on a classical computer.

1.3. Quantum Gate Sets and Circuits

A set of quantum gates is 'universal' if any computation (unitary transformation) can be approximated on any number of qubits to any precision when using only gates from the set. On the high-level programming side, languages provide logical gates that can operate on arbitrary qubits. However, not all logical gates can be physically implemented on hardware. On the hardware side, a quantum device exposes a minimal set of native gates that constitute a universal set.

For example, quantum chips built from superconducting qubits usually provide a gate set consisting of single-qubit rotations (e.g., Rx(90), Ry(180), Rz(θ)) and two-qubit controlled NOT (CNOT) gates that flip the target qubit if the control qubit is |1⟩. While high-level representation of an algorithm with logical gates (quantum circuit) is usually hardware-agnostic, it gradually becomes hardware-aware when going through several stages of transformation to be finally composed of only a set of native gates.

1.4. Quantum Control Unit

The quantum control unit acts as an interface between software and hardware components in the quantum computational stack. This unit manages control and data flow, as well as timing control for algorithm execution. In addition, the unit transforms the circuit into a sequence of control pulses (stored in the pulse library or shaped during execution) compatible with the low-level control hardware. The quantum execution control unit is both software-aware and hardware-aware.

In order to improve computational capabilities and scalability of a quantum computer, the control unit should be placed in close proximity to the quantum chip. This close proximity reduces control pulse propagation delay, improves the ability to control multiple qubits at the same time, and provides fast-feedback for error correction. Recent development efforts favor the relevance of this approach. Moving the control unit into a low-temperature environment will impose additional design constraints that further emphasize the importance of the present disclosure.

1.5. Low-Level Control and Quantum Chip

Low-level control hardware (backend) is usually composed of Arbitrary Waveform Generators (AWGs), Digital-to-Analog and Analog-to-Digital Converters (DACs and ADCs), as well as numerous filters and amplifiers. Quantum chips with superconducting qubits are placed inside a dilution refrigerator and communicate with external components through wires. Low-level hardware and a quantum chip operate at the level of physical pulses with very limited or no knowledge about the computation model or algorithm being run, so they are software-agnostic.

The three intermediate levels, such as gate set, quantum circuit, and control unit must cooperate in order to provide a suitable interface and advance the state of quantum theory-practice entanglement.

The present disclosure describes a Quantum Instruction Set Architecture (QUASAR) for use in a control unit (control processor).

2. Embodiments

Quantum Instruction Set Architecture (QUASAR) is described, which provides an interface between the software (a program that can be called a quantum circuit) and hardware (generation of the gates) that in classical computing is referred to as Instruction Set Architecture (ISA). The ISA acts like a translator that transforms the running program into a set of physical pulses. In contrast to the software or virtual implementation of a set of special-purpose instructions, hardware implementation requires defining a format of the instruction (instruction specification) that is tightly coupled with the processor architecture design.

The proposed quantum ISA (QUASAR) has been preferably designed as an extension to a RISC ISA, such as the RISC-V ISA. That means that the design implementation relies on the basic functionalities of the conventional ISA, such as memory operations, ALU operations, conditional and unconditional branches, and register file usage. Design of an ISA specification is a challenging task since there are a large number of combinations in the design specification which determine how efficient the ISA is for various programs and algorithms. Analysis and exploration of the design space is usually performed by numerous executions of a large number of different benchmarks on top of a hardware platform that can be parameterized to allow for measuring certain efficiency metrics.

In case of quantum ISAs, there were no benchmarks or metrics that would be suitable to do such an evaluation. So, an evaluation methodology was a first step towards developing efficient quantum ISA designs. A second step was the design of the ISA specification baseline, which highly depends on the level of expertise and experience in the field as a prerequisite for making certain design decisions. The present disclosure was developed based on a need's determination after a significant study of the quantum computing community, so as to provide a suitable combination of operations with future scalability and parallelism in mind. A third step consists of the physical implementation of the designed ISA using Hardware Description Languages (HDL), which in the present disclosure utilizes a novel Chisel Hardware Description Language (HDL) to implement QUASAR. It should be appreciated that Chisel HDL is an open-source HDL used to describe digital electronics and circuits at the register-transfer level, which inherits object-oriented and functional programming aspects from the Scala programming language for describing digital hardware.

The implemented ISA (processor) can be implemented to run on FPGA or be used with other synthesis tools to make an ASIC implementation. It will be noted that the FPGA or ASIC may be configured for being controlled by machine code and/or netlists. The processor(s) and supporting devices, such as of a control unit, should be placed in close proximity to the quantum chip. Finally, to be able to fully use the processor some forms of software support are required, for example compilers, libraries, and so forth.

RISC-V is an open ISA that has been designed to support computer architecture research and education, and has been adopted by industry resulting in multiple custom-designed commercial implementations. The philosophy behind RISC-V promotes open collaboration, base set simplicity, and special-purpose extensibility. The RISC-V ISA consists of a base integer set (T), a number of standard extensions that do not conflict with other standard extensions, as well as non-standard extensions that are highly specialized and may conflict with other extensions except for the base integer. The base integer instruction set includes integer computational instructions, integer loads, integer stores, and control-flow instructions. It provides two complete instruction-width variants, i.e., 32-bit or 64-bit denoted as RV32I or RV64I respectively, that define the integer register size and the corresponding size of the user address space as well as a 128-bit variant under development. Among standard extensions, there are multiplication and division ('M'), atomic instructions ('A'), single-, double-, quad-precision and decimal floating point ('F', 'D', 'Q' and 'L'), compressed instructions ('C') and others.

Implementations according to the present disclosure can have a significant impact on the quantum computing field for academia and industry. If deployed within a collaborative, such as Alpine Quantum Technologies® (AQT), it would allow a large spectrum of experiments for AQT users. A majority of large computer technology companies invest in research and development of the quantum control stack that includes smart control solutions at the edge.

Moreover, it has been designed for large scale experiments and with the idea of a cold environment in mind. Further research and experiments would include studies of low-temperature electronics to enable quantum control processors to be placed in close proximity to quantum chips.

The present disclosure has been designed to provide modularity and scalability. Moreover, the RISC-V ecosystem is growing fast and provides various tools and solutions to accompany the invention. Other competing technologies are shown to be a design point without actual support from performance evaluation.

2.1. RV32 Base Quantum Instruction Set Extensions (QUASAR)

2.1.1. Base Instruction Formats

In the RV32 QUASAR extension 'Xq' there are four sub-sets of operations: single-qubit gates, two-qubit gates, measurement operations and timing control operations.

Each instruction from these four sub-sets can be encoded using immediate or register-based format. The extension consists of 31 instructions using a fixed 32-bit length that requires a new instruction encoding space. QUASAR is a Greenfield extension that uses the operation code (opcode) prefix '10' thereby conflicting with the standard compressed instruction extension 'C'. The term Greenfield extension is used to describe an extension that begins populating a new instruction encoding space, and hence can only cause encoding conflicts at the prefix level.

The proposed encoding focuses on maximizing the number of qubits that can be addressed by a single instruction. This decision is based on current trends that suggest reducing the number of different gates per a gate set.

FIG. 1 illustrates an example embodiment 10 of QUASAR instruction format encoding. Each immediate subfield is labeled with the bit position (imm[x]) in the immediate value being produced, rather than the bit position within the instruction's immediate field as is usually done.

There are ten encoding formats: SingleQubit immediate (SQi) type 12, Single-Qubit mask (SQm) type 14, Single-Qubit Arbitrary immediate (SQAi) type 16, Single-Qubit Arbitrary mask (SQAm) type 18, Two-Qubit immediate (TQi) type 20, TwoQubit mask (TQm) type 22, Measurement immediate (Mi) type 24, Measurement mask (Mm) type 26, Timing immediate (Ti) type 28, and Timing mask (Tm) type 30.

The instructions are composed of four encoding components, i.e., a 7-bit opcode, the source (rs1 and rs2) and destination (rd) registers located at the same position and five special-purpose immediates, i.e., a 9-bit AU (imm[8:0]) located at inst[25, 19:12], a 9-bit BI located at inst[29:26, 24:20], a 4-bit AO (imm[3:0]) located at inst [25, 14:12], a 4-bit BO located at inst [29:26] and a 25-bit T located at inst [31:7].

It should be noted that the number of immediate bits to address a single qubit is chosen such as to enable maximum qubit addressing in both formats (immediate and mask) and for both classes of quantum gate operations (single-qubit and two-qubit).

The RISC-V ISA keeps the source (rs1 and rs2) and destination (rd) registers at the same position in all formats to simplify decoding.

2.2. Single-Qubit Standard Rotations

Single-qubit standard rotation instructions exist in two formats, i.e., immediate and register-based mask format.

FIG. 2 illustrates an example embodiment 50 of single-qubit standard rotation immediate instructions (SQi).

In case of the immediate format the instruction operates on a single qubit, whose ID is held in a 9-bit immediate value (AI-imm). With 9 bits, each instruction can address up to $2^8$ or 256 qubits. The opcode specifies the type of the quantum gate that can be x rotation, y rotation or identity gate. In the SQi format, bit regions [31:26], [24:20] and [11:7] are not used.

It will be noted that SQi instructions allow addressing only one qubit at a time, for example as follows:

x90i 1
y180i 57
ii 128

The SQi instruction opcode is composed of the 2 lowest bits set to '10' and the 5 highest bits whose value ranges from 0x10 to 0x1C. Single-qubit standard rotations are X90, Y90, X180, Y180, X270, Y270 and Identity.

FIG. 3 illustrates an example embodiment 70 of single-qubit standard rotation mask instructions (SQm).

The register-based mask format SQm operates on a 32-bit range of qubits held in the register rs1 with an offset sliding value held in a 4-bit immediate value (AO-imm). Totally, 32-bit mask and 4-bit offset can address 256 qubits.

SQm instructions allow addressing 32 continuous qubits at a time. The mask needs to be loaded into the rs1 register prior to the SQm instruction execution. RISC-V ISA supports loading a 32-bit value with two immediate instructions: ADDI and LUI. ADDI adds the sign-extended 12-bit immediate to register rs1. Arithmetic overflow is ignored, and the result is simply the low XLEN bits of the result.

ADDI rd, rs1, 0 is used to implement the MV rd, rs1 assembler pseudo instruction.

LUI (load upper immediate) is used to build 32-bit constants and uses the U-type format. LUI places the U-immediate value in the top 20 bits of the destination register rd, filling in the lowest 12 bits with zeros.

Example instructions are as follows.

lui t1, 0x10184
addi t2, t1, 0)(404
y270 t2, 0

The SQm instruction opcode is composed of the 2 lowest bits set to '10' and 5 highest bits which value ranges from 0x12 to 0x1E. Single-qubit standard rotations are X90, Y90, X180, Y180, X270, Y270 and Identity.

2.3. Single-qubit Arbitrary Rotations

Single-qubit arbitrary rotation instructions exist in two formats, i.e., immediate and register-based mask format. Similar to the single-qubit standard rotations, the immediate format instructions operate on a single qubit, with ID held in a 9-bit immediate value (AI-imm). The opcode specifies the type of the quantum gate, such as z rotation. The arbitrary phase is located in the rs2 register. In the SQi format bit regions [31:26] and [11:7] are not used.

FIG. 4 illustrates an example embodiment 90 of single-qubit arbitrary rotation immediate instructions.

SQAi instructions allow addressing only one qubit at a time. The phase needs to be loaded into the rs2 register prior to the SQAi execution. The RISC-V ISA supports loading a 32-bit value with two immediate instructions: ADDI and LUI, with examples shown below.

lui t1, 0xf1d
addi t2, t1, 0x10
zi 35, t2

Figure 5:
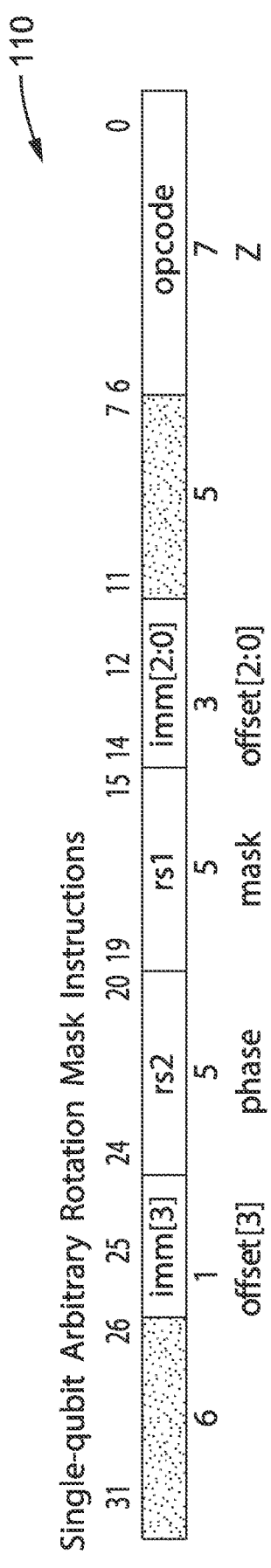
FIG. 5 is an opcode map for a single-qubit arbitrary rotation mask instruction, according to at least one embodiment of the present disclosure.

FIG. 5 illustrates an example embodiment 110 of single-qubit arbitrary rotation mask instructions.

SQAm instructions allow addressing 32 continuous qubits at a time. The mask needs to be loaded into the rs1 register prior to the SQAm instruction execution. Also, the phase needs to be loaded into the rs2 register prior to the SQAi execution. Examples are shown below.

lui t1, 0x124
addi t2, t1, 0x57
lui t1, 0x68
addi t3, t1, 0xa7b
z t2, 0, t3

2.4. Two-Qubit Instructions

Two-qubit instructions exist in two formats, for example, immediate and register-based mask format. In case of the immediate format, the instruction operates on a pair of two qubits, the IDs are held in two immediate locations, for instance AI-imm and BI-imm. With two 9-bit immediate values, a single instruction can address two qubits expressing single-instruction multiple-qubits parallelism.

Figure 6:
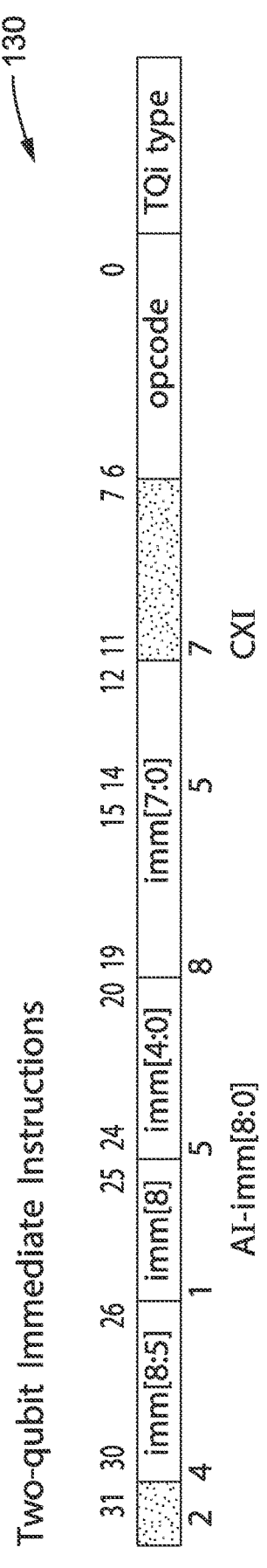
FIG. 6 is an opcode map for a two-qubit immediate instruction, according to at least one embodiment of the present disclosure.

FIG. 6 illustrates an example embodiment 130 of two-qubit immediate instructions.

TQi instructions allow addressing only one pair of qubits at a time.

cxi 1, 212
cxi 15, 28

TQm instructions allow addressing 32 continuous qubits at a time. The mask needs to be loaded into the rs1 and rs2 registers prior to TQm instruction execution.

2.5. Measurement Instructions

Measurement instructions exist in two formats, i.e., immediate and register-based mask format. These utilize the same encoding strategy as for the single-qubit gate application, while also specifying a destination register rd address to place the measured values for further use.

In case of the immediate format, the instruction operates on a single qubit, having an ID which is held in a 9-bit immediate value (AI-imm). With 9 bits, each instruction can address up to $2^8$ or 256 qubits. The result of the measurement is written back to the destination register specified by the rd in binary format. Until the data is ready to be written from the quantum interface, the Measurement Status Register (MSR) keeps track of (maintains information on) the following instructions to stall the execution in case of a dependency.

Mi instruction allows addressing only one qubit at a time, for example as follows:

mi 1, t2
mi 57, t3

The register-based mask format Mm operates on a 32-bit range of qubits held in the register rs1 with an offset sliding value held in a 4-bit immediate value (AO-imm). In total, the use of the 32-bit mask and 4-bit offset can address 256 qubits.

Example instructions are as follows.

lui t1, 0x10184
addi t2, t1, 0x404
mm t2, 0, t3

2.6. Timing Control Instructions

Timing control instructions exist in two formats, i.e., immediate and register-based mask format. Unlike other instructions that use general purpose registers, time stamp instructions rely on the special purpose (sp) register that contains the current value of the quantum circuit time stamp.

In case of the Ti instruction, the 25-bit immediate value (T-imm) contains a value indicating relative progress over time. In at least one embodiment the Ti instruction performs the following computations: addi sp, sp and T-imm.

Example of the instructions:

ti 25

In case of the Tm instruction, the value held in the rs1 register contains the relative progress over time. The value needs to be loaded into the rs1 register prior to the Tm instruction execution. In at least one embodiment, the Tm instruction performs the following computations: add sp, sp and rs1.

Example of the instructions:

lui t1, 0x10184
addi t2, t1, 0x404
tm t2

3. ICE Core Implementation

ICE is the first implementation of the proposed quantum control processor ISA. ICE in at least one embodiment incorporates a 32-bit processor that executes the RISC-V base integer set and the disclosed non-standard QUASAR extension ('RV32IXq'). It should be appreciated, however, that the present disclosure is not limited to any specific processor or type of processor; but can be utilized with different processors, multiple processors, and processors within application specific integrated circuits (ASICs).

The acronym ICE stands for In Cold Environment, as the core that executes the Quantum Instruction Set Architecture (QUASAR) can, in at least one embodiment, be placed in a cold environment. It should also be appreciated that the present system can also be utilized in embodiments which are not retained in a cold environment, such as locations kept at room temperature.

Processor hardware can be implemented in a number of ways, such as using a Hardware Extension Language (HDL), exemplified as being implemented with the Chisel HDL. The Chisel HDL provides both the software and hardware models while using a single code base. Given that developing Chisel code is comparable to functional programming and therefore much less tedious than Register Transfer Level (RTL) coding, the overall effort to construct both software and hardware models is dramatically reduced. In addition, there are only meager efforts, if any, required to provably match the behavior of the software code to the RTL, which otherwise is a non-trivial and time-consuming process. The choice of language for the hardware design was influenced by the strong need of a point design of a core; but also, one that can provide the flexibility to evaluate and extend it further towards larger systems with increasingly complex components.

3.1 Micro-Architecture

The ICE micro-architecture is based on a multiple stage in-order implementation from the open-source academic processor collection.

Figure 7:
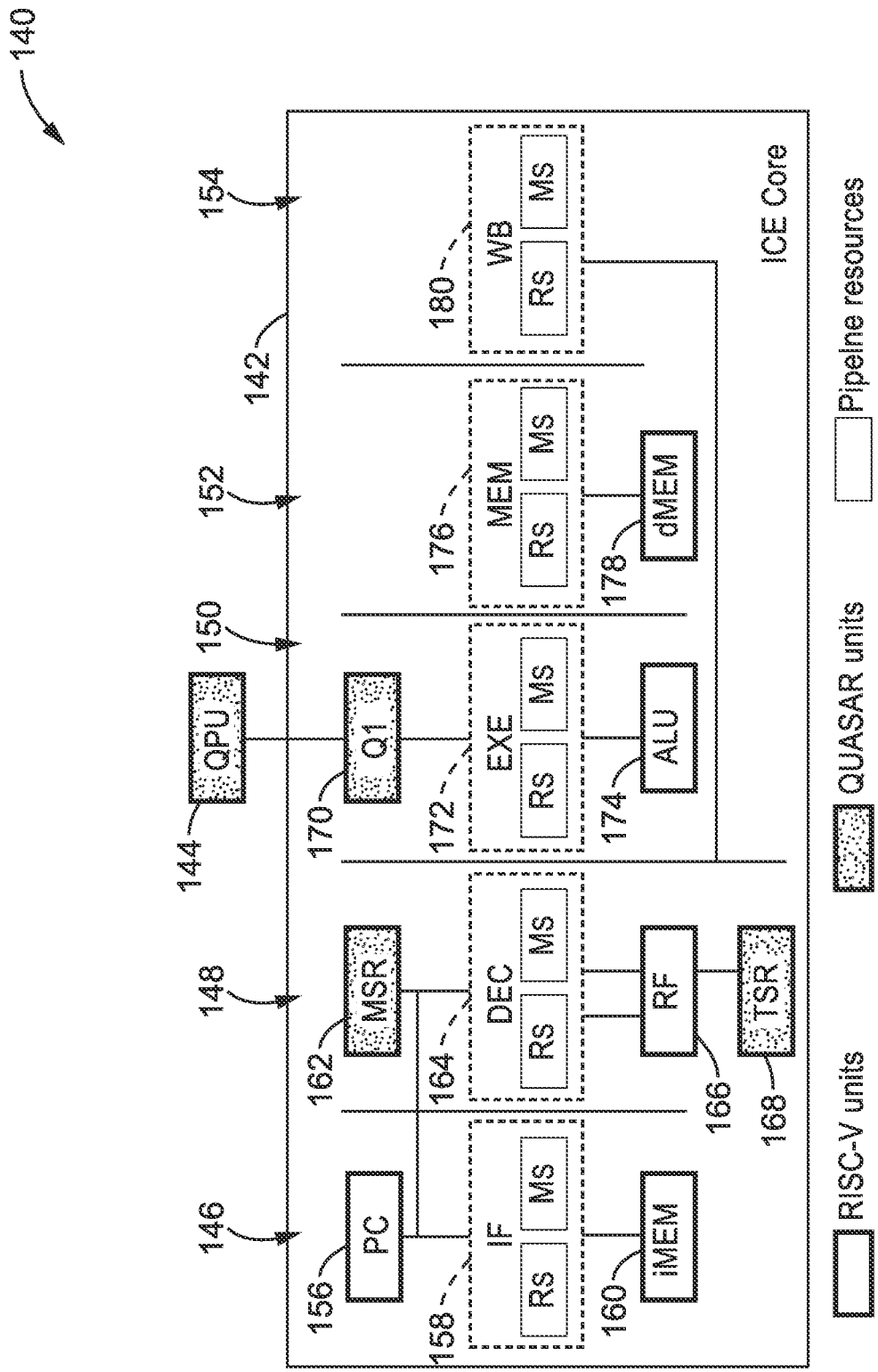
FIG. 7 is a block diagram of pipeline stages of an ICE core processor, according to at least one embodiment of the present disclosure.

FIG. 7 illustrates an example embodiment 140 of the pipeline stages of the ICE core 142 with a Quantum Processor Unit (QPU) 144. By way of example and not limitation, the ICE examples herein are configured having five processor stages: instruction fetch (IF) 146, decode (DEC) 148, execute (EXE) 150, memory access (MEM) 152 and write-back (WB) 154. It should be appreciated, however, that these stages can be combined to form fewer stages, or divided to yield additional stages, without departing from the teachings of the present examples.

The processor can be built from common components, such as Data Memories (dMEM) 178 and Instruction Memories (iMEM) 160, Register File (RF) 166 having a plurality of registers, such as 32 general purpose registers, Arithmetic and Logic Unit (ALU) 174, and other sequential and/or logic based components. It may also include additional components designed to support and improve QUASAR extension execution. Each stage is shown with a unit containing pipeline resources of Rs and Ms that represent general purpose registers, or measurement registers respectively.

In IF stage 146 a Program Counter (PC) 156 and Instruction Memory (iMem) 160 are RISC-V units which are coupled to the instruction fetch unit 158. The program counter (PC) 156 is also shown coupled from the IF stage to Decoder unit 164 of the Decoding stage 148.

A decoding stage 148 is shown with special purpose QUASAR units of a Measurement Status Register (MSR) 162 and a Time Stamp Register (TSR) 168.

The MSR file 162 handles measurement instruction dependencies by tracking the destination address and the actual data status. It consists of a plurality of entries (for example 16 entries), where the entry number corresponds to the number of offset regions (e.g., 32-bit offset regions) among the qubit range (e.g., 512-qubit range). Each of the MSR file entries contain two fields: (i) destination address (e.g., 5 bits) and status mask (e.g., 32 bits).

By way of example and not limitation, the MSR file in this example supports three input commands, exemplified as write, read, and status check. The write command is issued by the processor data path at the moment the measurement instruction is executed. Therefore, the processor does not need to stall while awaiting measurement data before continuing program execution. The read command is issued when the measurement data arrives from the quantum accelerator interface triggering an interrupt in the pipeline to complete the measurement. Also, the processor updates the status in the MSR file. A status check command is called from the data path to ensure measurement dependencies. In case the status mask shows that the corresponding bits in the register are not valid, the processor is stalled until the dependency is resolved.

The TSR 168 enables the timing control instructions described in Section 2.2. Since the is instruction performs an add operation, its execution relies on the ALU, but uses different operand sources and write-back destination. The TSR is shown coupled through Register File 166 to Decoding unit 164.

Execution stage 150 depicts a Quantum Interface (QI) 170 and an Arithmetic Logic Unit 174 (RISC-V unit) connected to the execution unit 172. The QI is a special QUASAR unit for enabling fast communication with the control back end, which is responsible for the control pulses generation and measurement data post-processing. The QI consists of the output and input buffers to transfer control gate sequences towards QPU 144 and qubit readout data back to the control processor. QI provides a ready-valid interface which allows the processor to check the status of the backend and stall execution in case this is required.

A memory access (MEM) stage 152 is shown with MEM unit 176 and a RISC-V data Memory (dMEM) 178.

A write-back (WB) stage 154 is also shown with a write back unit 180 and is shown coupled back to an execute (EXE) stage to support bypassed operand forwarding.

As the processor is pipelined, there are a number of potential data hazards that can lead to incorrect computations or unwanted pipeline stalls. To resolve these hazards, the processor supports pipeline bubbles and fully bypassed operand forwarding. Among QUASAR extension instructions, only ts/tsi and m/mi require the write-back. All single-qubit and two-qubit gate instructions are issued at the EXE stage 150 to then be executed in the QPU 144. Unlike immediate format instructions, all mask format gate instructions have register dependencies. In view of its full bypassing implementation, the ICE processor does not need to insert non-operation instructions (NOPs) thereby reducing the number of cycles required to execute a quantum circuit.

4. Evaluation Methods 4.1. Quantum Circuits

Quantum computing has a number of traits which are beneficially addressed by an algorithmic representation that is distinct from that of classical computing. Among these traits are the uniqueness of each individual qubit that requires explicit operation locality.

Also, continuous evolution of the system state puts strict requirements on the gate application timing, which thus puts strict real time requirements on the control system. Therefore, at this early stage of Noisy Intermediate-Scale Quantum Computing (NISQ) devices, quantum algorithms are often represented as quantum circuits. A quantum circuit illustrates quantum computation as a sequence of quantum gates applied on a quantum register. At any given time, any number of gates (e.g., none through multiple gates) can be applied concurrently. The description of the quantum circuit in a programming language strongly depends on the circuit characteristics and particular language capabilities.

Following are examples showing how differences in quantum circuits impact the associated assembly code by using the QUASAR-extended ISA and why those extensions are important.

Figure 8A:
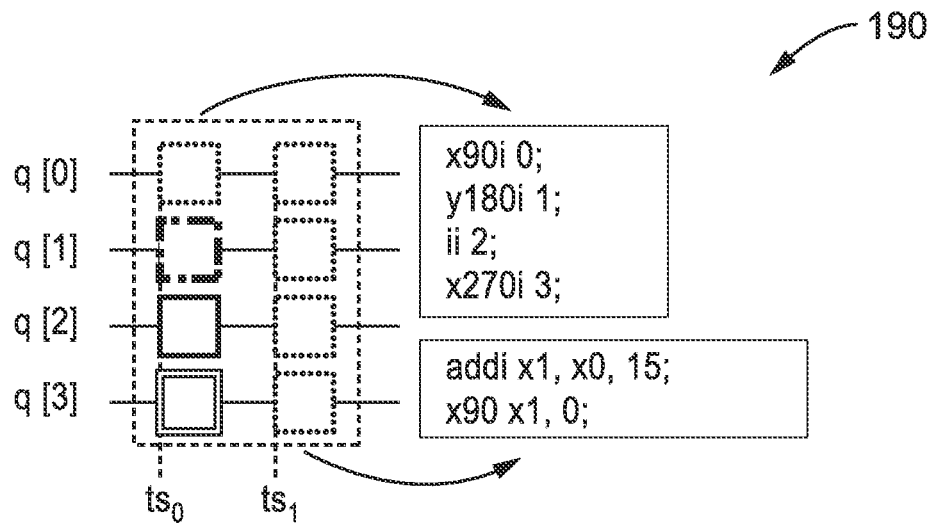
FIG. 8A and FIG. 8B are representations of quantum circuits showing single-bit and two-bit gates with associated QUASAR assembly code, according to at least one embodiment of the present disclosure.
Figure 8B:
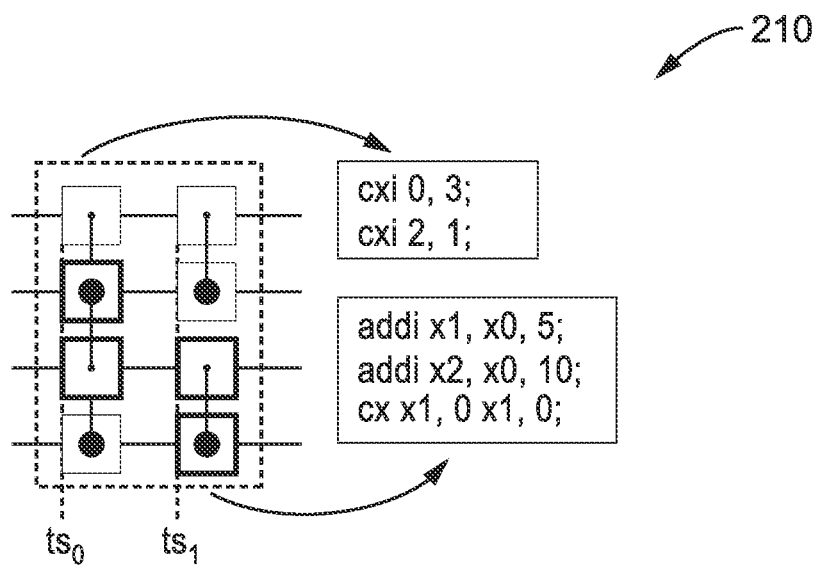

FIG. 8A and FIG. 8B illustrate example embodiments 190, 210 representing typical quantum circuits and the associated QUASAR assembly code. Circuits in this example are shown composed of single-qubit or two-qubits gates. Four different shadings indicate the different types of gates, with the arrows indicating source-target direction in two-qubits gates. Two fragments are shown here of a quantum circuit composed of different single-qubit and two-qubit gates.

In FIG. 8A is shown the case of a single-qubit gate circuit, the difference can be in rotation axis or rotation angle, e.g., x90 or y180. At time ts0, all of the applied gates are different that can be expressed using the immediate instruction format resulting in four instructions.

At time ts1, all of the applied gates are the same and using the mask format the circuit fragment can be expressed in two instructions instead of four.

In FIG. 8B is shown the case of the two-qubit gate circuit, the difference can be in the distance between two qubits or in target-control qubit direction. Due to the requirement to load the mask to the register prior to the quantum instruction execution, use of the immediate format results in two instructions, while the mask requires one additional load.

Figure 9:
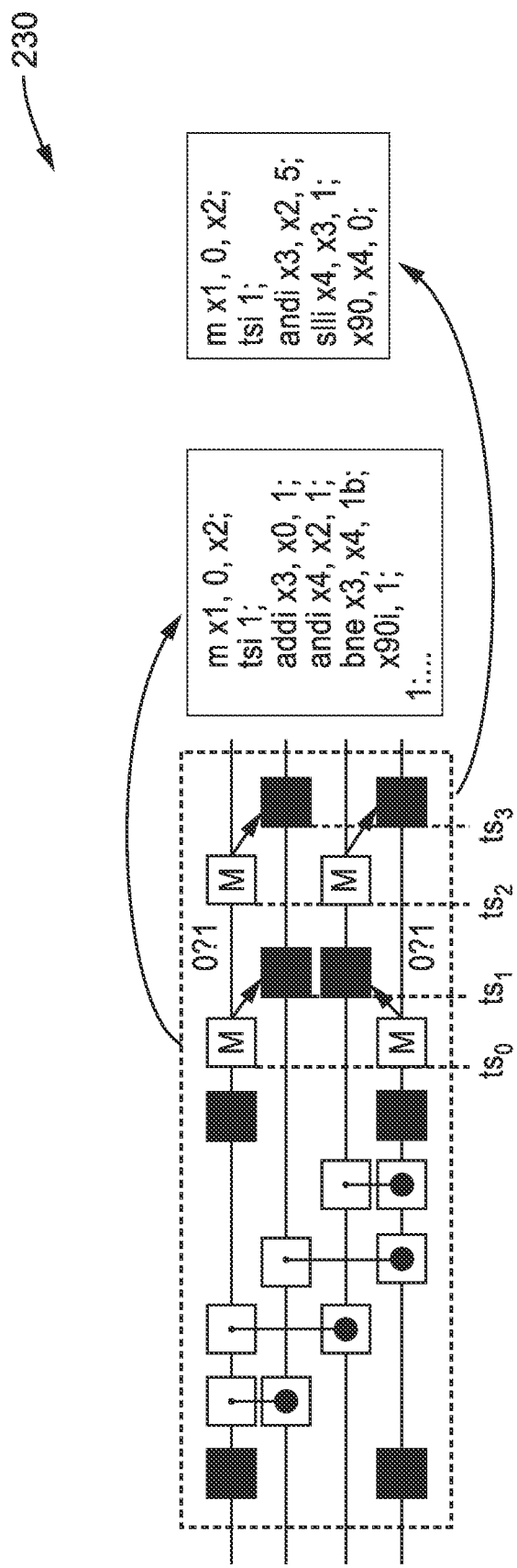
FIG. 9 is a representation of quantum circuits showing an algorithm subroutine and a measurement-dependent subroutine, according to at least one embodiment of the present disclosure.

FIG. 9 illustrates an example embodiment 230 representing typical quantum circuits and the associated QUASAR assembly code. The circuit is shown with an algorithm subroutine on the left side, and a measurement-dependent subroutine on the right side depicted through times ts0 through ts4 and showing arrows indicating data dependencies. The figure depicts a fragment of a surface error correction code circuit that contains measurement dependencies.

At time ts0, measurement gates are applied on qubits q[0] and q[3]. After the measurement is completed, the values are expected in register x2. Depending on the values in x2, the gates are applied on qubits q[1] and q[2] at time stamp ts1. To check the condition, at least three instructions are required prior to the quantum gate instruction, for example 'addi' to load the expected value, 'andi' to pick the bits that correspond to the target qubits and 'beq' for conditional branching. This set of instructions varies depending on the position of the target qubits, e.g., lower 12 bits, upper 20 bits or both as well as the expected values, e.g., 0 or 1. However, the circuit may contain measurement dependencies with similar patterns as that shown at time ts2 and ts3. This pattern contains two similarities: the distance between the measured and dependent qubits, and the type of the conditionally applied gates.

If such a pattern exists in the circuit, the mask format can be used instead of the conditional branching, resulting in a significant reduction of the instructions per circuit fragment.

Thus, the number of instructions per a circuit fragment can significantly vary, especially in a realistic large scale scenario. It is important to quantify these variations and determine a set of rules for efficient code generation. Moreover, the number of instructions per time stamp directly affects whether or not the control processor will meet timing constraints in order to deliver gates for the next time stamp cycle.

5. General Scope of the Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

A method for compiling a source program for controlling a quantum computing system, comprising: (a) receiving a source program, as software, of an instruction set architecture (ISA) that models a quantum computing system; (b) decoding each instruction in said source program and first checking its opcode and determining its specific instruction as to whether it is a single-qubit gate operation, a two-qubit gate operation, a measurement operation or a timing control operation; (c) determining whether each said specific instruction is an immediate or register-based operation; (d) decoding the specific instruction along with any source and/or destination registers to generate machine code and/or netlists for execution by a quantum control unit configured for controlling a quantum computer chip and its associated low-level control hardware; and (e) wherein said method provides an interface for rapid and consistent development for controlling quantum computing systems which have a different quantum computer chip, or quantum computer chips, and their associated low-level control hardware.

A method of controlling a quantum computer, comprising: (a) controlling and managing data flow and execution timing, by a quantum control unit, configured for coupling to a quantum computer chip and its associated low-level control hardware; and (b) implementing an instruction set architecture (ISA) on said quantum control unit with programming, as software, configured with multiple encoding formats toward maximizing the number of qubits of the quantum computer chip that can be addressed by each instruction as directed to the quantum computer chip and its low-level control hardware; (c) wherein instructions executing on said quantum control unit direct the low-level control hardware in directing qubit operations of said quantum computer chip; and (d) wherein said method provides an interface for rapid and consistent development for controlling quantum computing systems which may utilize different quantum computer chips and associated low-level control hardware.

An apparatus for controlling a quantum processor unit, comprising: (a) a quantum control unit configured for controlling the operations of a quantum processor unit, wherein said quantum control unit comprises multiple processor stages, encompassing operations comprising an instruction fetch (IF) stage having an instruction fetch unit; a decoding (DEC) stage having a decoding unit; an execution (EXE) stage having an execution unit; a memory access (MEM) stage having a memory unit; and a write-back (WB) stage having a write back unit; (b) wherein said quantum control unit can comprise common components, including data memories (dMEM) in the memory access stage and instruction memories (iMEM) of the IF stage; (c) wherein said DEC stage has a register file (RF) having a plurality of registers, and said EXE stage has an arithmetic and logic unit (ALU) and other sequential and/or logic based components; (d) wherein each said stage contains pipeline resources comprising general purpose registers (RS), and/or measurement registers (MS), respectively; (e) wherein said IF stage has a program counter (PC) and instruction memory (iMem) which are reduced-instruction-set computer (RISC) based units and are coupled to the IF stage, and the PC is also coupled from the IF stage to a decoder unit in the DEC stage; (f) wherein said DEC stage comprises special purpose quantum processor units of a measurement status register (MSR) and a time stamp register (TSR); (g) wherein said MSR register handles measurement instruction dependencies by tracking a destination address and an actual data status, and said MSR comprises a plurality of entries in which each entry number corresponds to a number for an offset region within a qubit range, and each of the MSR register entries contain two fields as a destination address and status mask; (h) wherein said TSR enables the timing control instructions and is coupled through the RF to the DEC stage; (i) wherein said EXE stage includes a quantum interface (QI) for establishing a communication hardware connection with a control back end of the quantum processor unit, wherein the control back end of the quantum processor unit is configured for generating control pulses and performing measurement data post-processing; (j) wherein said QI comprises input and output buffers to transfer control gate sequences toward the quantum processor unit and receive qubit readout data back into the quantum control unit, whereby QI provides an interface which can check status of the back end of said quantum processor unit and stall execution thereof as required; (k) wherein said MEM stage contains a RISC data Memory (dMEM); and (l) wherein the write back unit of said WB stage is coupled to said EXE stage to support bypassed operand forwarding.

The method or apparatus of any preceding implementation, wherein said ISA controls interactions between hardware and software in describing a set of available operations, machine instruction format, supported data types, registers, and memory addressing, for accessing specialized features for controlling quantum computing systems which may have different quantum computer chips and associated low-level control hardware.

The method or apparatus of any preceding implementation, wherein said ISA is configured for generating quantum gate computations applied on direct-addressed qubits and/or qubit registers, memory load/store operations, and conditional and non-conditional statements for execution branching and measurement-based feedback support.

The method or apparatus of any preceding implementation, wherein said low-level control hardware comprises arbitrary waveform generators (AWGs), digital-to-analog and analog-to-digital converters (DACs and ADCs), filters and amplifiers.

The method or apparatus of any preceding implementation, wherein said ISA comprises an extension to a reduced instruction set computer (RISC).

The method or apparatus of any preceding implementation, wherein said RISC computer architecture comprises a fifth generation RISC architecture (RISC-V).

The method or apparatus of any preceding implementation, wherein said multiple encoding formats comprise: single qubit immediate (SQi) type, single-qubit mask (SQm) type, single-qubit arbitrary immediate (SQAi) type, single-qubit arbitrary mask (SQAm) type, two-qubit immediate (TQi) type, two qubit mask (TQm) type, measurement immediate (Mi) type, measurement mask (Mm) type, timing immediate (Ti) type, and timing mask (Tm) type.

The method or apparatus of any preceding implementation, wherein instructions within said instruction set architecture (ISA) are compiled from a high-level notation into machine code and/or netlists for execution by said quantum control unit.

The method or apparatus of any preceding implementation, wherein said ISA controls interactions between hardware and software in describing a set of available operations, machine instruction format, supported data types, registers, and memory addressing, for accessing specialized features for controlling different quantum computing systems which may have different quantum computer chips and associated low-level control hardware.

The method or apparatus of any preceding implementation, wherein said ISA is configured for generating quantum gate computations applied on direct-addressed qubits and/or qubit registers, memory load/store operations, and conditional and non-conditional statements for execution branching and measurement-based feedback support.

The method or apparatus of any preceding implementation, wherein said low-level control hardware comprises arbitrary waveform generators (AWGs), digital-to-analog and analog-to-digital converters (DACs and ADCs), as well as filters and amplifiers.

The method or apparatus of any preceding implementation, wherein said instruction set architecture (ISA) comprises an extension to a reduced instruction set computer (RISC).

The method or apparatus of any preceding implementation, wherein said RISC computer architecture comprises a fifth generation RISC architecture (RISC-V).

The method or apparatus of any preceding implementation, wherein said multiple encoding formats comprise: single qubit immediate (SQi) type, single-qubit mask (SQm) type, single-qubit arbitrary immediate (SQAi) type, single-qubit arbitrary mask (SQAm) type, two-qubit immediate (TQi) type, two-qubit mask (TQm) type, measurement immediate (Mi) type, measurement mask (Mm) type, timing immediate (Ti) type, and timing mask (Tm) type.

The method or apparatus of any preceding implementation, wherein said quantum control unit is configured for being placed in close proximity to the quantum computer chip.

The method or apparatus of any preceding implementation, further comprising containing the quantum control unit and the quantum computer chip and its associated low-level control hardware in a low-temperature environment.

The method or apparatus of any preceding implementation, wherein said quantum control unit is pipelined for supporting pipeline bubbles and fully bypassed operand forwarding, toward resolving incorrect computations and unwanted pipeline stalls.

The method or apparatus of any preceding implementation, wherein said MSR register supports three input commands comprising write, read, and status check: (a) said write command is issued by the processor data path at the moment the measurement instruction is executed, whereby the quantum control unit does not need to stall while awaiting measurement data before continuing program execution; (b) said read command is issued when measurement data arrives from the QI triggering an interrupt in the pipeline to complete measurement; and (c) said status check command is called from a data path to ensure measurement dependencies, and when a status mask indicates that corresponding bits in a register are not valid, the quantum control unit is stalled until the dependency is resolved.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising", "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly, the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A method of controlling a quantum computer, comprising:
   controlling and managing data flow and execution timing, by a quantum control unit, configured for coupling to a quantum computer chip and its associated low-level control hardware; and
   implementing an instruction set architecture (ISA) on said quantum control unit with programming, as software, configured with multiple encoding formats toward maximizing the number of qubits of the quantum computer chip that can be addressed by each instruction as directed to the quantum computer chip and its low-level control hardware;
   wherein instructions executing on said quantum control unit direct the low-level control hardware in directing qubit operations of said quantum computer chip;
   wherein said method provides an interface for rapid and consistent development for controlling quantum computing systems which may utilize different quantum computer chips and associated low-level control hardware;
   wherein the quantum control unit has multiple stages of operations comprising instruction fetch (IF) stage, instruction decoding (DEC) stage, instruction execution (EXE) stage, memory access (MEM) stage, and write-back (WB) operations stage; and
   wherein the WB operating stage is also directly coupled to the EXE stage in supporting bypass operand forwarding, whereby non-operation instructions (NOPs) do not need to be inserted toward reducing the number of cycles required to execute a quantum circuit.

2. The method of claim 1, wherein instructions within said instruction set architecture (ISA) are compiled from a high-level notation into machine code and/or netlists for execution by said quantum control unit.

3. The method of claim 1, wherein said ISA controls interactions between hardware and software in describing a set of available operations, machine instruction format, supported data types, registers, and memory addressing, for accessing specialized features for controlling different quantum computing systems which may have different quantum computer chips and associated low-level control hardware.

4. The method of claim 1, wherein said ISA is configured for generating quantum gate computations applied on direct-addressed qubits and/or qubit registers, memory load/store operations, and conditional and non-conditional statements for execution branching and measurement-based feedback support.

5. The method of claim 1, wherein said low-level control hardware comprises arbitrary waveform generators (AWGs), digital-to-analog and analog-to-digital converters (DACs and ADCs), as well as filters and amplifiers.

6. The method of claim 1, wherein said instruction set architecture (ISA) comprises an extension to a reduced instruction set computer (RISC).

7. The method of claim 1, wherein said RISC computer architecture comprises a fifth generation RISC architecture (RISC-V).

8. The method of claim 1, wherein said multiple encoding formats comprise: single qubit immediate (SQi) type, single-qubit mask (SQm) type, single-qubit arbitrary immediate (SQAi) type, single-qubit arbitrary mask (SQAm) type, two-qubit immediate (TQi) type, two-qubit mask (TQm) type, measurement immediate (Mi) type, measurement mask (Mm) type, timing immediate (Ti) type, and timing mask (Tm) type.

9. The method of claim 1, wherein said quantum control unit is configured for being placed in close proximity to the quantum computer chip.

10. The method of claim 9, further comprising containing the quantum control unit and the quantum computer chip and its associated low-level control hardware in a low-temperature environment.

11. A method of controlling a quantum computer, comprising:
- controlling and managing data flow and execution timing, by a quantum control unit, configured for coupling to a quantum computer chip and its associated low-level control hardware; and
- implementing an instruction set architecture (ISA) on said quantum control unit with programming, as software, configured with multiple encoding formats toward maximizing the number of qubits of the quantum computer chip that can be addressed by each instruction as directed to the quantum computer chip and its low-level control hardware;
- wherein instructions executing on said quantum control unit direct the low-level control hardware in directing qubit operations of said quantum computer chip;
- wherein said method provides an interface for rapid and consistent development for controlling quantum computing systems which may utilize different quantum computer chips and associated low-level control hardware;
- wherein the quantum control unit has multiple stages of operations comprising instruction fetch (IF) stage, instruction decoding (DEC) stage, instruction execution (EXE) stage, memory access (MEM) stage, and write-back (WB) operations stage; and
- wherein said DEC stage is configured for tracking a destination address and the actual data status in a measurement status register (MSR) stage has a plurality of entries, with each entry containing a destination address and status mask, with the MSR stage configured for performing write, read and status check commands.

12. The method of claim 11, wherein said write command of the MSR stage is issued at the moment the measurement instruction is executed, whereby processing does not need be stalled while awaiting measurement data before continuing program execution.

13. The method of claim 11, wherein said read command of the MSR stage is issued when the measurement data arrives from the quantum accelerator interface triggering an interrupt in the pipeline to complete the measurement, and to update the status in the MSR file.

14. The method of claim 11, wherein said status check command of the MSR stage is called from the data path to ensure measurement dependencies, and if the status mask indicates that the corresponding bits in the register are not valid, then processing is stalled until the dependency is resolved.

* * * * *